United States Patent [19]

Antkowiak

[11] Patent Number: 4,591,030
[45] Date of Patent: May 27, 1986

[54] ELASTOMERIC DAMPED SHOCK ABSORBER

[75] Inventor: Robert G. Antkowiak, Pendleton, N.Y.

[73] Assignee: Tayco Developments, Inc., North Tonawanda, N.Y.

[21] Appl. No.: 600,790

[22] Filed: Apr. 16, 1984

[51] Int. Cl.[4] .............................. F16F 9/30; F16F 1/36
[52] U.S. Cl. ...................................... 188/268; 267/153; 267/63 R
[58] Field of Search ...................... 188/268, 129, 381; 267/9 B, 63 R, 63 A, 141, 152, 153, 140; 57/200, 210; 293/136

[56] References Cited

U.S. PATENT DOCUMENTS

| | | | |
|---|---|---|---|
| 2,407,634 | 9/1946 | DuPont | 57/200 |
| 2,681,800 | 6/1954 | Taylor | 267/63 R |
| 3,376,031 | 4/1968 | Lee | 267/136 |
| 3,591,164 | 6/1971 | Jamieson | 188/268 |
| 3,814,470 | 6/1974 | Kicher et al. | 293/136 |
| 3,948,497 | 4/1976 | Lovitt et al. | 188/268 |

FOREIGN PATENT DOCUMENTS 0892049 12/1981 U.S.S.R. ................ 188/268

Primary Examiner—Duane A. Reger
Assistant Examiner—Alvin Oberley
Attorney, Agent, or Firm—Joseph P. Gastel

[57] ABSTRACT

A shock absorber including a casing housing an elongated elastomeric member within a chamber, the elastomeric member being distorted from its original cylindrical shape into an undulating shape by being held between a piston and an end wall of the chamber, the undulating shape causing substantial axially extending axially spaced portions to be maintained in frictional engagement with the walls of the casing, said frictional engagement providing a damping force as the piston enters the chamber to further distort the elastomeric member. A shock absorber of the general type set forth above wherein a plurality of helically intertwined elongated elastomeric members are located within the casing, rather than a single elongated elastomeric member.

13 Claims, 5 Drawing Figures

ELASTOMERIC DAMPED SHOCK ABSORBER

BACKGROUND OF THE INVENTION

The present invention relates to an improved simple type of shock absorbing device.

By way of background, there are numerous known types of shock absorbing devices utilizing compressible elastomeric materials. Certain of these devices utilize elastomeric foam fillings which break down in use. Other types of shock absorbing devices rely on special shapes of elastomeric inserts which act in the nature of pure elastic members to give a spring-like type of shock absorbing action. However, devices of this type do not produce any significant damping effect, but merely a spring effect.

SUMMARY OF THE INVENTION

It is one important object of the present invention to provide a low cost energy absorber which will give good damping and a reset action.

Another object of the present invention is to provide an improved low cost energy absorber which will work satisfactorily over a reasonable temperature range without creating substantial internal heating due to internal molecular action.

Yet another object of the present invention is to provide an improved energy absorber which can be tailored simply and easily to produce different damping parameters.

A further object of the present invention is to provide an improved low cost highly simplified energy absorber which will provide long life and reliable operation without deterioration. Other objects and attendant advantages of the present invention will readily be perceived hereafter.

The present invention relates to a shock absorber comprising a casing with wall means defining a chamber having a first volume and an axis, elongated elastomeric means in said chamber extending lengthwise of said axis and having first and second ends, said elongated elastomeric means being of a second volume which is less than said first volume, said elongated elastomeric means being of undulating shape with first substantial spaced portions extending lengthwise of said axis for frictional engagement with said wall means and with second substantial spaced portions extending lengthwise of said axis located between said first substantial spaced portions and located in spaced relationship to said wall means, piston means in said chamber proximate said first end, holding means in said chamber proximate said second end for holding said second end against movement, and mounting means for mounting said piston means for movement into said chamber to move said first end toward said second end and thus cause said first substantial spaced portions to provide substantial frictional rubbing engagement with said wall means as they are caused to travel lengthwise of said axis as said elastomeric member is distorted by said portion. The various aspects of the present invention will be more fully understood when the following portions of the specification are read in conjunction with the accompanying drawings wherein:

DESCRIPTION OF THE PREFERRED EMBODIMENTS

Figure 1:
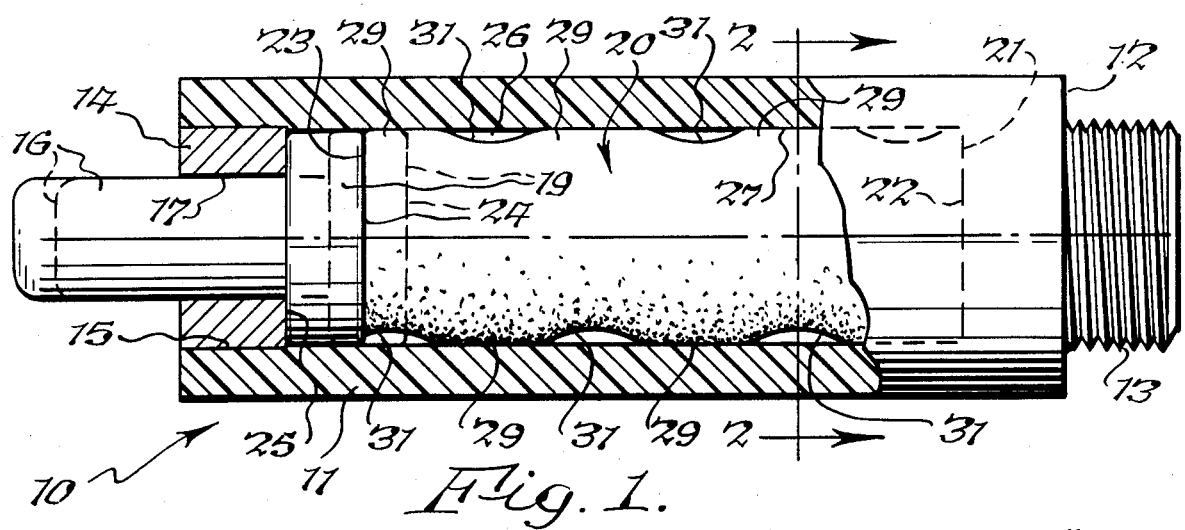
FIG. 1 is a cross sectional view, partially broken away, showing the improved shock absorber of the present invention.

The improved shock absorber 10 of the present invention includes a cylindrical casing 11 of a suitable material such as plastic having an integral end wall 12 with a threaded end 13 for mounting casing 11 in its operative environment. An annular end wall 14, which may be made of metal, is press-fitted, or otherwise suitably secured, within end portion 15 of casing 11. A piston rod 16 is slidably received within opening 17 of end wall 14 and a piston 19 is secured at the end of piston rod 16.

In accordance with the present invention, an elongated elastomeric member 20 has its first end 21 in abutting relationship with abutment 22 provided by end wall 12. The other end 23 of elongated elastomeric member 20 bears against the face 24 of piston 19. Movement of piston 19 to the left in FIG. 1 is prevented by a stop which is the annular face 25 of annular member 14.

Figure 2:
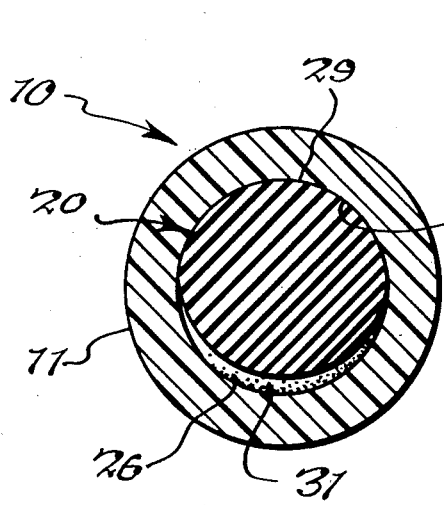
FIG. 2 is a cross sectional view taken substantially along line 2—2 of FIG. 1.

Elongated elastomeric member 20, before insertion into chamber 26 defined by cylindrical wall 27, was originally of cylindrical shape. However, after placement into chamber 26 and being distorted between abutment 22 and piston face 24, it assumes an undulating shape wherein spaced portions 29 which extended longitudinally of the axis of chamber 30 are forced into firm frictional engagement with adjacent portions of chamber wall 27. Spaced portions 29 are thus held in engagement with wall 27 under a force produced by the resiliency of member 20. Second longitudinally spaced portions 31 of elongated elastomeric member 20 remain in spaced relationship to chamber wall 27. As can be seen from FIG. 2, contacting portions 29 not only maintain contact with substantial axial portions of wall 27, but also maintain contact with substantial circumferential portions. In other words, contacting portions 29 of elastomeric member 20 are forced into frictional engagement with a relatively large percentage of the entire wall surface 27.

When piston 19 is moved from its solid line position in FIG. 1 to its dotted line position, the undulating elastomeric member 20 will be distorted to a greater degree than shown in FIG. 1, and such distortion will cause portions 29 to come into more forceful contact with chamber wall 27 as the spaces between portions 31 and the chamber wall 27 will be reduced as the elastomeric member 20 tends to fill the spaces. It will be appreciated that the elastomeric member 20 itself, while being elastic, is not compressible.

The elastomeric member 20 is preferably fabricated from neoprene, silicone rubber or a similar material which has good resistance to crushing, twisting and rubbing and which is tough and resilient and which has low internal molecular damping. This type of material is commonly found in hydraulic seals of the O-ring type. The shock absorption which is obtained by the construction of FIG. 1 is due to the frictional effect of the relatively long spaced portions 29 of the highly resilient elastomer rubbing against the chamber surface 27. Because the elastomer is solid, rather than a foam wherein gas bubbles are trapped between thin membranes, there is low internal heat build-up during compression. Furthermore, where the elastomer 20 is fabricated from silicone rubber, it does not have as much friction as other rubbers, thereby providing a certain amount of lubricity and thus does not tend to abrade.

Figure 3:
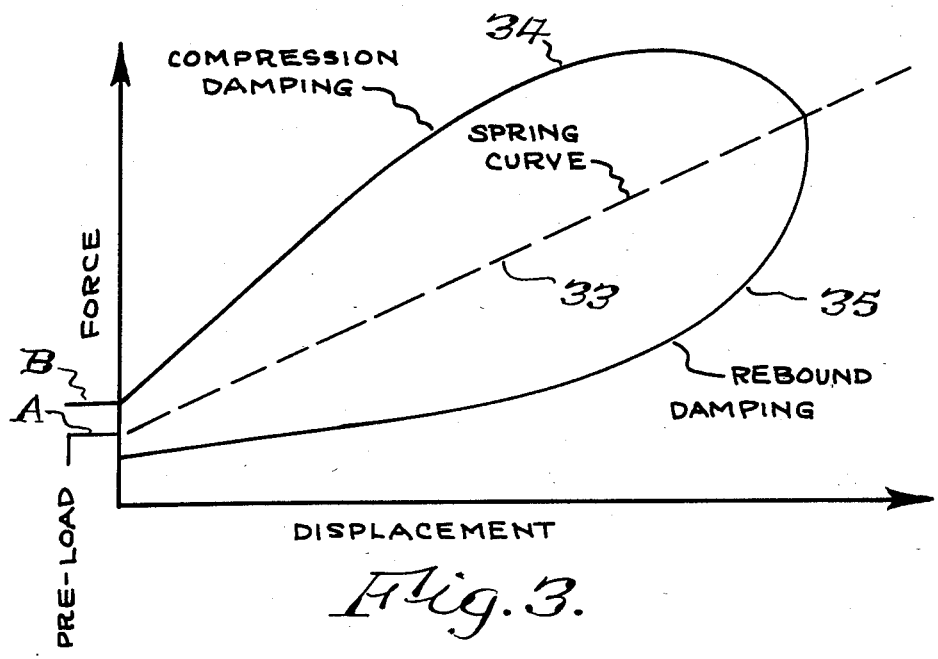
FIG. 3 is a force-displacement diagram for the shock absorber of FIG. 1.

The action of the shock absorber of FIG. 1 can be more fully understood from the force-displacement diagram of FIG. 3 wherein the dotted line 33 represents the spring curve of the elastomer 20. During the application of a compressive force to elastomer 20, the damping, as represented by curve 34, is due to the additive effect of the spring curve plus the frictional drag of elastomer portions 29 on surface 27. When the compressive force on piston 19 is released, a rebound curve 35 is obtained wherein the frictional drag of portions 29 of elastomer 20 subtracts from spring force 33. The foregoing thus provides a hystresis loop, which essentially produces a shock absorber with a spring reset system inherently incorporated therein. It can be seen from FIG. 3 that ordinate point A represents the preload on elastomeric member 20 and that as piston 19 tends to be moved into chamber 26 defined by cylindrical wall 27, there will be no displacement until there is a build-up to force B.

The cylindrical elastomeric member 20, before compression into the shape shown in FIG. 1, has a smaller diameter than cylindrical chamber 26. It is the application of compressive forces to the cylindrical member 20, as noted above, which causes it to form the undulating shape wherein portions 29 are forced into frictional engagement with wall 27 to cause a frictional drag when piston 19 is moved further into chamber 26. The relationship between the volume of chamber 26 and elastomeric member 20 is such that when piston 19 is moved to its greatest extent into chamber 26, only the spaces between member 20 and wall 27 will tend to be filled. There should be no attempt made to compress the elastomeric member 20 itself, which is for all practical purposes incompressible. In other words, the relationship between member 20 and the volume of chamber 26 is that the total volume of member 20 in its undistorted state should be less than the volume remaining in chamber 26 when piston 19 has gone its maximum distance into said chamber.

It will be appreciated that by the use of the foregoing construction, shock absorbers having different shock absorbing characteristics can be manufactured. In this respect, by varying the relationship between the diameter of elastomeric member 20 in its undistorted state, on one hand, and the diameter of chamber 26, on the other hand, the frictional resistance upon movement of piston 19 can be varied. The higher the ratio between the diameter of chamber 26 and the diameter of elastomeric member 20, the softer will be the shock absorbing force. The smaller this ratio, the stiffer will be the shock absorbing force. Also, the greater the ratio between the length of member 20 and chamber 26, the greater will be the amount of contact therebetween, which increases the damping force. Thus, a particular casing 11 can provide different shock absorbing forces which vary with the diameter and length of the elastomeric member 20. In other words, the greater the volume of rubber, the greater the damping force because there will be a greater frictional resistance force and a greater spring force. The converse is also true.

Another characteristic of the shock absorber of FIG. 1 is that there will be very low heat build-up during operation. The heat which is generated will be due substantially only to the frictional effect between elastomeric portions 29 and cylinder wall 27. There will be no appreciable internal molecular friction. Thus, since the energy absorption occurs at the cylinder wall where friction exists, the heat will pass through the cylinder walls, as this is the path of least resistance between it and the elastomeric itself. Furthermore, there will be a certain amount of breathing past piston 19 and through piston rod opening 17. Thus, the energy absorber of FIG. 1 will run cooler than prior types using a foam type of elastomer because the energy dissipation occurs at the cylinder wall rather than by internal molecular action.

Another characteristic of the shock absorber of FIG. 1 is that it will not degrade like foam type of elastomers which comprise thin wall-like members encapsulating gas pockets, wherein the thin walls will degrade with repeated stress.

Figures 4, 5:
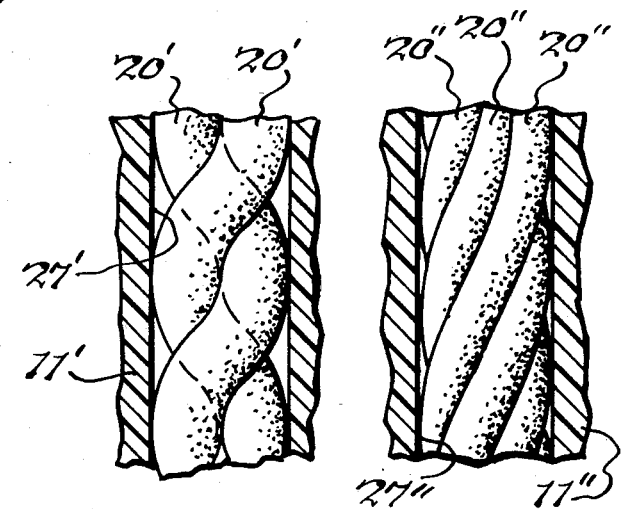
FIG. 4 is a fragmentary view, partially in cross section, of a modified form of the shock absorber of FIG. 1.
FIG. 5 is a fragmentary view, partially in cross section, of a still further modified form of the shock absorber of FIG. 1.

A modified form of the present invention is shown in FIG. 4 wherein the casing 11' houses a pair of twisted cylindrical elastomeric members 20' which are in the form of a double helix. These are also compressed axially in the same manner described above relative to FIG. 1. The characteristic of this particular structure is that there is more surface contact between chamber wall 27' and the abutting portions of elastomeric members 20'. In FIG. 5 a still further embodiment ot the present invention is shown wherein there is a triple helix consisting of three elastomeric strands 20' confined under compression within chamber wall 27". In both of these embodiments, the amount of axial contact between the elastomeric members and the chamber walls will depend on the respective diameters and lengths, as discussed above relative to FIGS. 1 and 2.

While the elongated elastomeric members 20, 20' and 20" have been depicted as cylindrical prior to being distorted into their undulating shape by the preloading action of piston 19, it will be appreciated that these elastomeric members may be of any other columnar shape. Furthermore, in situations where very little or no preload is required, the elastomeric member 20 can be preformed into an undulating shape rather than being of original cylindrical shape before it was preloaded to the condition shown in FIG. 1. An embodiment of the latter type can be visualized from FIG. 1 if it is assumed that member 20 was preformed to the shape shown so that it would exert only a small force or no force on piston 19 in the position shown. Furthermore, with a preformed undulating member, axially extending portions 29 may be spaced from the chamber wall before the piston moves into chamber 26, and they may be forced into engagement with the piston wall as the piston distorts the elastomeric member.

One embodiment of the invention such as shown in FIG. 1 was fabricated wherein chamber 26 between piston 19 and end wall 22 was approximately 1¼ inches long with an internal diameter of approximatel 5/16 of an inch and wherein the elastomeric member was originally cylindrical and had a length of about 1⅛ inches and a diameter of about ¼ inch. It will be appreciated, however, that the improved shock absorber of the present invention can be made in various sizes while still incorporating the principles of the present invention.

While preferred embodiments of the present invention have been disclosed, it will be appreciated that the present invention is not limited thereto but may be otherwise embodied within the scope of the following claims.

What is claimed is:

1. A shock absorber comprising a casing with wall means defining a chamber having a first volume and an axis with said first volume being completely open and unobstructed within the confines of said wall means, elongated elastomeric means of substantially solid cross sectional configuration in said chamber extending lengthwise of said axis and having first and second ends, said elongated elastomeric means being of a second volume which is less than said first volume, said elongated elastomeric means being of undulating shape with first substantial spaced portions extending lengthwise of said axis for frictional engagement with said wall means and with second substantial spaced portions extending lengthwise of said axis located between said first substantial spaced portions and located in spaced relationship to said wall means, piston means in said chamber proximate said first end, a piston rod forming an extension of said piston means and including a portion located externally of said chamber for receiving an external force for transmittal to said piston, holding means in said chamber proximate said second end for holding said second end against movement out of said chamber under all conditions of operation of said shock absorber, and mounting means for mounting said piston rod for moving said piston means into said chamber to move said first end of said elongated elastomeric means toward said second end thereof to thereby tend to compress said elongated elastomeric means in addition to effecting distortion thereof and thus cause said first substantial spaced portions to provide substantial frictional rubbing engagement with said wall means as they are caused to travel lengthwise of said axis as said elongated elastomeric means is distorted by said piston means, said elongated elastomeric means returning to the condition it occupied before said piston moved into said casing when said external force is removed from said piston rod.

2. A shock absorber as set forth in claim 1 wherein said elongated elastomeric means comprise a single elongated member.

3. A shock absorber as set forth in claim 2 wherein said holding means comprise abutment means.

4. A shock absorber as set forth in claim 1 wherein said elastomeric means comprises a plurality of intertwined elongated members.

5. A shock absorber as set forth in claim 4 wherein said holding means comprise abutment means.

6. A shock absorber as set forth in claim 1 wherein said elongated elastomeric means comprises a plurality of intertwined members.

7. A shock absorber as set forth in claim 1 wherein said wall means define a cylindrical surface of a first diameter, and wherein said elongated elastomeric means is of circular cross section substantially throughout its length.

8. A shock absorber as set forth in claim 1 including stop means for limiting movement of said piston in a direction away from said elongated elastomeric means and wherein said elongated elastomeric means are under a compressive force between said holding means and said piston means when said piston means is in engagement with said stop means so as to maintain said first spaced portions in said frictional engagement with said wall means as a result of said compressive force.

9. A shock absorber as set forth in claim 8 wherein said elongated elastomeric means is an elongated elastomeric member of a substantially cylindrical shape prior to being positioned in said chamber between said piston means and said abutment means.

10. A shock absorber as set forth in claim 9 wherein said wall means define a second substantially cylindrical shape of a diameter which is greater than the diameter of the substantially cylindrical shape of said elongated elastomeric member.

11. A shock absorber as set forth in claim 8 wherein said elongated elastomeric means is an elongated elastomeric member of a regular columnar shape prior to being positoned in said chamber between said piston means and said abutment means.

12. A shock absorber as set forth in claim 8 wherein said elastomeric member is fabricated from the group of materials which include neoprene and silicone rubber.

13. A shock absorber as set forth in claim 8 wherein said elongated elastomeric means comprises a plurality of intertwined elongated members.

* * * * *